United States Patent
Lindoff et al.

(10) Patent No.: US 7,929,624 B2
(45) Date of Patent: Apr. 19, 2011

(54) CELL ID DETECTION IN CELLULAR COMMUNICATION SYSTEMS

(75) Inventors: Bengt Lindoff, Bjärred (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 620 days.

(21) Appl. No.: 11/762,379

(22) Filed: Jun. 13, 2007

(65) Prior Publication Data

US 2008/0101511 A1 May 1, 2008

Related U.S. Application Data

(60) Provisional application No. 60/863,041, filed on Oct. 26, 2006.

(51) Int. Cl.
*H04K 1/10* (2006.01)
(52) U.S. Cl. ......................................................... 375/260
(58) Field of Classification Search .................... 385/260
See application file for complete search history.

(56) References Cited

U.S. PATENT DOCUMENTS

| | | | | |
|---|---|---|---|---|
| 5,608,764 A * | 3/1997 | Sugita et al. | ............... | 375/344 |
| 5,682,376 A * | 10/1997 | Hayashino et al. | ............ | 370/206 |
| 5,963,592 A * | 10/1999 | Kim | .............................. | 375/232 |
| 6,310,856 B1 | 10/2001 | Taipale | | |
| 6,980,612 B1 | 12/2005 | Miyoshi | | |
| 7,035,343 B2 | 4/2006 | Chi et al. | | |
| 7,110,782 B2 | 9/2006 | Yamaguchi | | |
| 7,149,266 B1 * | 12/2006 | Imamura et al. | .............. | 375/355 |
| 7,333,470 B2 * | 2/2008 | Rimi et al. | .................... | 370/350 |
| 2003/0152178 A1 | 8/2003 | Tanno et al. | | |
| 2004/0004997 A1 | 1/2004 | Boesel et al. | | |
| 2004/0156454 A1 | 8/2004 | Kim | | |
| 2005/0025087 A1 | 2/2005 | Tamura | | |
| 2005/0099939 A1 * | 5/2005 | Huh et al. | ..................... | 370/210 |

(Continued)

FOREIGN PATENT DOCUMENTS

EP  1 475 899 B1  7/2006

(Continued)

OTHER PUBLICATIONS

Ding, "Cell Identification Scheme for OFDM Cellular Systems Based on a New Preamble Structure", International Conference on Wireless Communications, Networking and Mobile Computing, 2006, WiCOM 2006, Publication Year: Sep. 22, 2006, pp. 1-4.*

(Continued)

*Primary Examiner* — Juan A Torres
(74) *Attorney, Agent, or Firm* — Potomac Patent Group PLLC

(57) ABSTRACT

Ascertaining which one of a number of cells of a cellular communication system transmitted an Orthogonal Frequency Division Multiplexing (OFDM) signal involves obtaining reference symbols from the OFDM signal. Compensating phase shift values for phase aligning the plurality of reference symbols are estimated and used to generate phase corrected reference symbols. At least two scrambling code sequences are applied to the phase corrected reference symbols to obtain at least two de-scrambled phase corrected reference symbol sequences, wherein each of the scrambling codes is associated with a respectively different one of the cells of the cellular communication system. A power value of each of the de-scrambled phase corrected reference symbol sequences is ascertained. That one of the scrambling codes that is associated with a highest one of the power values is ascertained, thereby ascertaining which one of the number of cells of the cellular communication system transmitted the OFDM signal.

34 Claims, 5 Drawing Sheets

U.S. PATENT DOCUMENTS

| | | | |
|---|---|---|---|
| 2005/0163238 A1 | 7/2005 | Fujii | |
| 2006/0062196 A1* | 3/2006 | Cai et al. | 370/345 |
| 2006/0073802 A1 | 4/2006 | Chari et al. | |
| 2006/0126491 A1* | 6/2006 | Ro et al. | 370/208 |
| 2006/0233097 A1* | 10/2006 | Vrcelj et al. | 370/208 |
| 2006/0274820 A1* | 12/2006 | Walton et al. | 375/148 |
| 2007/0270273 A1* | 11/2007 | Fukuta et al. | 475/206 |

FOREIGN PATENT DOCUMENTS

| | | |
|---|---|---|
| WO | 2006/023536 A2 | 3/2006 |
| WO | 2006/130502 A2 | 12/2006 |

OTHER PUBLICATIONS

Kim, "A preamble-based cell searching technique for OFDM cellular systems," Vehicular Technology Conference, 2003, VTC 2003-Fall, 2003 pp. 2471-2475.*

International Preliminary Report on Patentability, mailed Feb. 12, 2009, in connection with International Application No. PCT/EP2007/060465.

PCT International Search Report, mailed Feb. 1, 2008, in connection with International Application No. PCT/EP2007/060465.

PCT Written Opinion, mailed Feb. 1, 2008, in connection with International Application No. PCT/EP2007/060465.

Hosein, P. et al.: "Integrated scheduling and buffer management for 3G wireless forward packet data channels" Vehicular Technology Conference, 2004, VTC2004-Fall, 2004 IEEE 60th Los Angeles, CA, USA. Sep. 26-29, 2004, Piscataway, NJ, USA. pp. 1134-1138, ISBN: 0-7803-8521-7, XP010786799.

R1-062990 "Outcome of cell search drafting session", TSG-RAN WG1 #46bis, Oct. 9-13, 2006, Seoul, Korea.

* cited by examiner

CELL ID DETECTION IN CELLULAR COMMUNICATION SYSTEMS

CROSS REFERENCE TO RELATED APPLICATIONS

This application claims the benefit of U.S. Provisional Application No. 60/863,041, filed Oct. 26, 2006, which is hereby incorporated herein by reference in its entirety.

BACKGROUND

The present invention relates to methods and apparatuses for identifying cells in a cellular communication system.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high capacity high data rate system in existing radio spectrum, a new system has to be able to utilize a bandwidth of varying size. A proposal for such a new flexible cellular system, called Third Generation Long Term Evolution (3G LTE), can be seen as an evolution of the 3G WCDMA standard. This system will use OFDM as the multiple access technique (called OFDMA) in the downlink and will be able to operate on bandwidths ranging from 1.25 MHz to 20 MHz. Furthermore, data rates up to 100 Mb/s will be supported for the largest bandwidth. However, it is expected that 3G LTE will be used not only for high rate services, but also for low rate services like voice. Since 3G LTE is designed for Transmission Control Protocol/Internet Protocol (TCP/IP), Voice over IP (VoIP) will likely be the service that carries speech.

One important aspect of LTE is the mobility function, hence synchronization symbols and cell search procedures are of major importance in order for the User Equipment (UE) to detect and synchronize with other cells.

The currently proposed cell search scheme for LTE is as follows:

1. Using the primary synchronization channel (P-SCH), detect the 5 ms timing of a new cell.
2. Detect frame timing and Cell group using the secondary synchronization channel (S-SCH).
3. Use the reference symbols (also called CQI pilots) to detect the cell ID. The interested reader is referred to the document R1-062990, entitled "Outcome of cell search drafting session", TSG-RAN WG1 #46bis, Oct. 9-13, 2006 for more information about this proposal.

The first two steps are well known in the art and are similar to the cell search scheme presently used in WCDMA systems. The third step is also used in WCDMA, where the pilot signal (CPICH) is scrambled with a pseudorandom noise sequence (pn-sequence) that determines the cell ID. By assuming the channel that affects the CPICH over a certain interval (one or two slots in WCDMA) is constant, one can detect the scrambling sequence easily.

The idea in LTE is also to scramble the reference symbols, both with a pn-sequence and also with an orthogonal code. However, unlike WCDMA, LTE does not have strong continuous pilot channels, but instead relies on fewer reference symbols (RS). These RS are placed in the first and third from last OFDM symbol in each subframe, and are placed on every sixth carrier, hence a distance of 90 kHz between the pilots. This is illustrated in FIG. 1, which depicts the proposed pilot (reference signal) pattern in the frequency (f) and time (t) dimension for the LTE system. In the figure, the first reference symbols are denoted "$R_1$"; the second reference symbols are denoted "$R_2$"; and data are denoted "D".

A fundamental problem with using pilot symbols that are transmitted on different sub-carriers for scrambling code identification is that the phases for the different sub-carriers are typically affected in different and unknown ways from one another. This means that, unlike in WCDMA systems in which the channel is constant over the one or two slots and hence no phase equalization is needed to perform cell ID detection, in LTE systems coherent alignment of the pilots without equalization is not feasible, making the scrambling detection procedure much harder in an LTE system than in earlier known systems. Some examples of how delay-spread and sampling error affect the channel for different sub-carriers are described in U.S. Patent Application Publication No. US-2008-0101488-A1 to Wilhelmsson and Lindoff entitled "Robust and Low-Complexity Combined Signal Power Estimation".

Consequently, there is a need for algorithms that allow for coherent alignment of pilots in OFDM systems like LTE therefore making it possible to use the pilots for cell ID detection.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for ascertaining which one of a number of cells of a cellular communication system transmitted an Orthogonal Frequency Division Multiplexing (OFDM) signal. In one aspect this involves obtaining a plurality of reference symbols from the OFDM signal. One or more compensating phase shift values for aligning the plurality of reference symbols with respect to phase are estimated. A plurality of phase corrected reference symbols are generated by using the one or more compensating phase shift values to align the plurality of reference symbols with respect to phase. At least two scrambling code sequences are applied to the phase corrected reference symbols to obtain at least two de-scrambled phase corrected reference symbol sequences, wherein each of the scrambling codes is associated with a respectively different one of the cells of the cellular communication system, and wherein each of the scrambling code sequences comprises at least one of a pseudorandom noise sequence and an orthogonal code. For example, in LTE systems, applying the scrambling code sequence comprises scrambling by applying a pseudorandom noise sequence and also applying an orthogonal code. A power value of each of the de-scrambled phase corrected reference symbol sequences is ascertained. That one of the scrambling codes that is associated with a highest one of the power values is ascertained, thereby ascertaining which one of the number of cells of the cellular communication system transmitted the OFDM signal.

In one aspect, the reference symbols may be obtained from different sub-carriers of the OFDM signal.

In another aspect, estimating the one or more compensating phase shift values for aligning the plurality of reference symbols with respect to phase comprises ascertaining a delay spread value of a channel through which the OFDM signal was transmitted, and estimating the one or more compensating phase shift values as a function of the delay spread value. For example, this could involve computing a phase shift between a first sub-carrier at frequency $f_i$ and a second sub-carrier at frequency $f_k$ in accordance with:

$$\text{compensating phase shift} = e^{j2\pi(f_i - f_k)\Delta t},$$

wherein $\Delta t$ is the delay spread value.

In some alternative embodiments, obtaining the plurality of reference symbols from the OFDM signal comprises applying a Fast Fourier Transform (FFT) to a plurality of samples of the OFDM signal; and estimating the one or more compensating phase shift values for aligning the plurality of reference symbols with respect to phase comprises ascertaining which of the plurality of samples of the OFDM signal would be a starting point of the FFT causing a smallest rotation across sub-carriers. The one or more compensating phase shift values are then estimated as a function of a relative distance between an actual starting point of the FFT and the starting point of the FFT causing the smallest rotation across sub-carriers. In some embodiments, the starting point of the FFT causing the smallest rotation across sub-carriers corresponds to a maximum peak of a power delay profile of a channel through which the OFDM signal was transmitted. In some alternative embodiments, the starting point of the FFT causing the smallest rotation across sub-carriers corresponds to a center of gravity of a power delay profile of a channel through which the OFDM signal was transmitted.

In yet other alternative embodiments, estimating the one or more compensating phase shift values for aligning the plurality of reference symbols with respect to phase comprises ascertaining a power delay profile of a channel through which the OFDM signal was transmitted and applying a Fast Fourier Transform (FFT) to the power delay profile to obtain an estimate of the channel through which the OFDM signal was transmitted. The estimate of the channel is then used to obtain the one or more compensating phase shift values as a function of the delay spread value. The power delay profile can be obtained, for example, by correlating differently delayed expected versions of a known signal with an actually-received known OFDM signal to find the correlation peaks. An example of a known signal is a signal obtained from a Primary-Synchronization Channel in the cellular communication system.

In still other alternative embodiments, estimating the one or more compensating phase shift values for aligning the plurality of reference symbols with respect to phase comprises obtaining a frequency-domain representation of a received known OFDM symbol and dividing the frequency-domain representation of the received known OFDM symbol by a frequency-domain representation of an expected known OFDM symbol to obtain an estimate of the channel through which the OFDM signal was transmitted. The estimate of the channel is used to obtain the one or more compensating phase shift values as a function of the delay spread value. The received known OFDM symbol can be obtained, for example, from a Secondary-Synchronization Channel in the cellular communication system.

In yet other alternative embodiments, estimating the one or more compensating phase shift values for aligning the plurality of reference symbols with respect to phase comprises applying each of a plurality, K, of hypothesized sets of phase corrections to the plurality reference symbols to obtain K sets of hypothesized phase corrected reference symbols. In such embodiments, applying at least two scrambling code sequences to the phase corrected reference symbols to obtain at least two de-scrambled phase corrected reference symbol sequences comprises applying at least two scrambling code sequences to each of the K sets of hypothesized phase corrected reference symbols to obtain at least 2K de-scrambled phase corrected reference symbol sequences. In some of these embodiments, another aspect includes using information about a delay spread of a channel through which the OFDM signal was transmitted to initially obtain the K hypothesized sets of phase corrections. In some alternative embodiments, information about a power delay profile of a channel through which the OFDM signal was transmitted is used to initially obtain the K hypothesized sets of phase corrections. Also, in some but not necessarily all embodiments, each of the hypothesized sets of phase corrections can comprise phase correction values that are linear across sub-carriers.

BRIEF DESCRIPTION OF THE DRAWINGS

The objects and advantages of the invention will be understood by reading the following detailed description in conjunction with the drawings in which.

DETAILED DESCRIPTION

Figure 1:
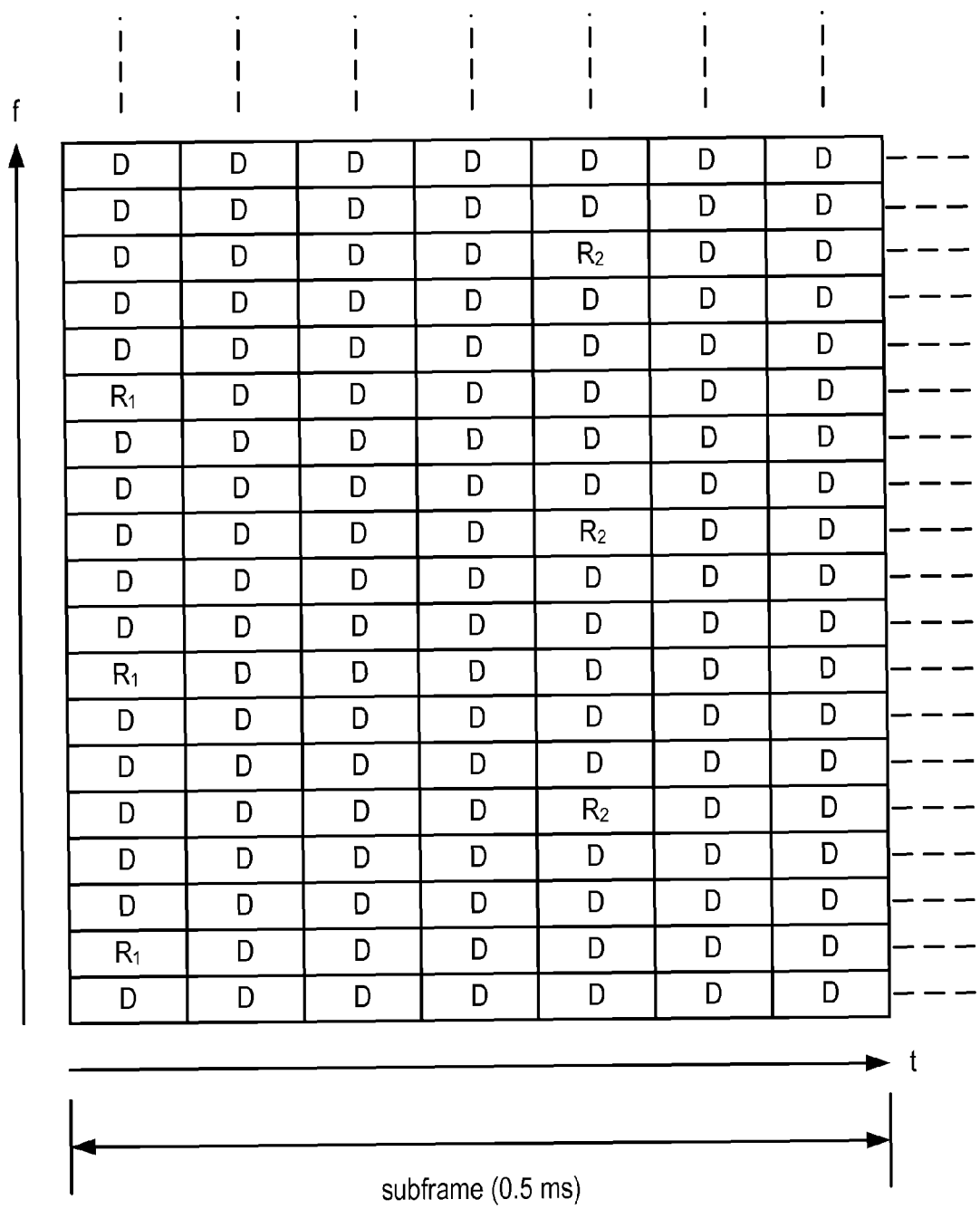
FIG. 1 depicts the proposed pilot (reference signal) pattern in the frequency and time domain for the LTE system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An aspect of the invention involves aligning the reference symbols with respect to phase without utilizing a reference phase obtained by channel estimation. Alternative embodiments utilize different ways of achieving this. In one, the phase shifts between the different reference symbols are estimated and compensated before performing scrambling code detection.

In an alternative embodiment, a blind approach is proposed. In this case, the phase shift between the different RS is assumed to be proportional to the frequency distance. Scrambling code detection is performed for all different factors for this proportional relation. The one giving the best result (in terms of maximum energy) is chosen.

These and other aspects are described in greater detail in the following.

Figure 2:
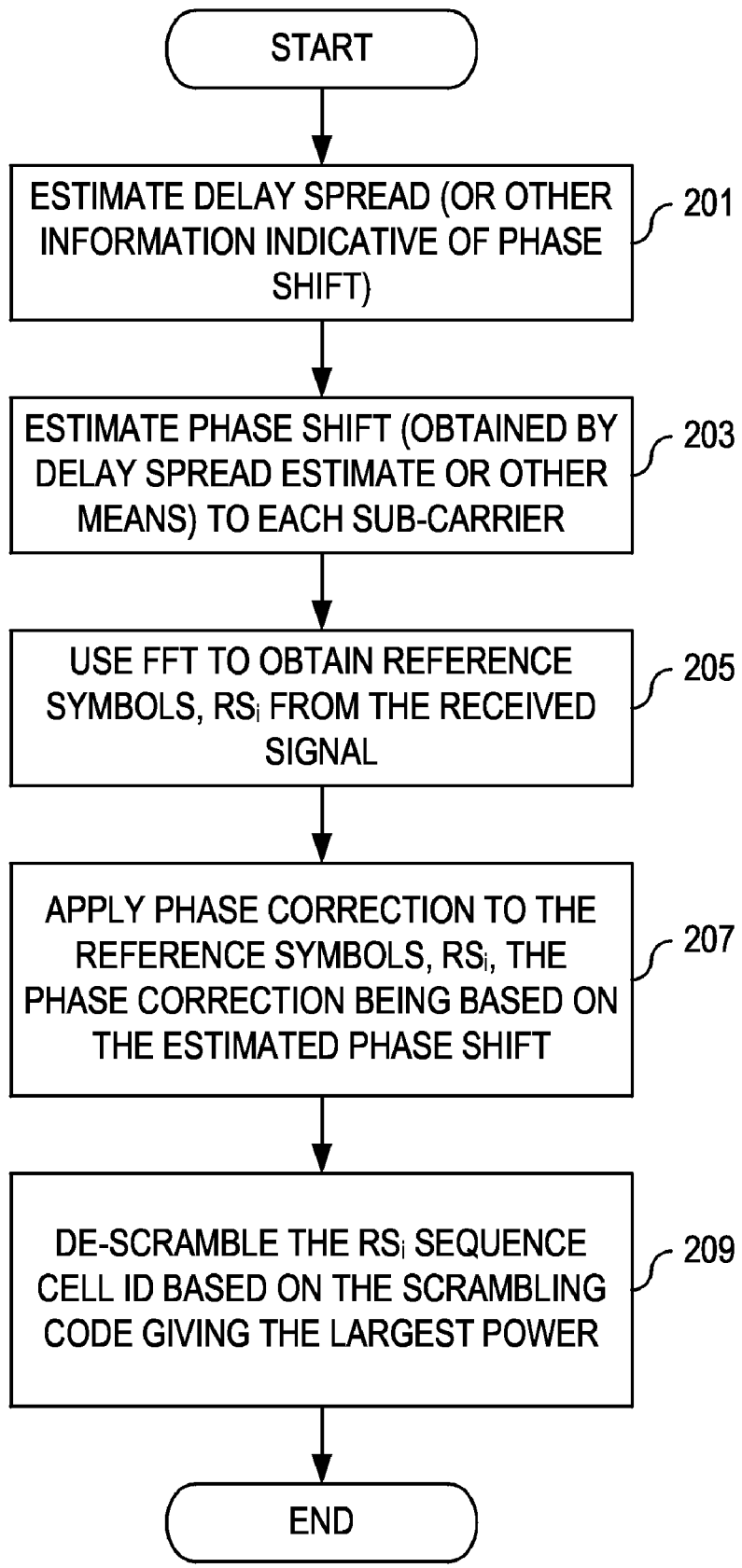
FIG. 2 is a flowchart depicting steps/processes performed in cellular communication equipment consistent with embodiments of the invention.

FIG. 2 is a flowchart depicting steps/processes performed by suitable logic (e.g., hardware or software in conjunction with hardware) operating in cellular communication equipment consistent with embodiments of the invention. The delay spread of the channel is estimated by analyzing the received signal in a delay spread estimator (step 201). As used herein, the term "delay spread" refers to the time delay between a received signal associated with what is substantially a shortest radio path between transmitter and receiver, and a delayed version of that signal associated with a substantially longest radio path. As used herein, the term "substantially shortest" means the shortest path the signal can traverse and still be received with a non-insignificant amount of energy. Similarly, the term "substantially longest" means the longest path the signal can traverse and still be received with a non-insignificant amount of energy. This allows the possibility that shorter or longer paths exist, but are not considered because the energy of the received signal does not exceed a predefined minimum threshold. Various techniques for estimating delay spread are known, and therefore need not be described here. In an LTE system, the P-SCH can be used for obtaining the delay spread. However, the invention is not limited to any one particular technique.

The delay spread is then applied in a suitable model of the phase variations as a function of the sub-carrier frequency. As an example, the following two tap channel model may be used:

$$h(t)=\delta(t)+\delta(t-\Delta t), \quad (1)$$

where $\Delta t$ is the delay spread, and the corresponding channel transfer function in the frequency domain, H(f), is then given by $$H(f)=1+e^{-j2\pi f\Delta t}=2e^{-j\pi f\Delta t}\cos(\pi f\Delta t). \quad (2)$$

From these equations it can be seen that the phase shift between two sub-carriers (at frequencies $f_i$ and $f_k$) having pilot symbols, given the delay spread $\Delta t$, is a linear function of the distance, in frequency, between the carriers, that is, $e^{j2\pi(f_i-f_k)\Delta t}$. In addition to estimating the phase shift for each sub-carrier, the received signal is processed by a Fast Fourier Transform (FFT) to obtain the reference symbols (step 205). In this exemplary embodiment, this step is depicted as occurring after making the delay spread and phase shift estimations. However, it will be appreciated that processing the received signal with an FFT need not be dependent on these earlier steps, so whether the FFT is performed first, last, or somewhere in between is irrelevant.

Taking the phase of the reference symbol for the lowest sub-carrier (RS0) as a reference (e.g., assuming that the phase of RS0=0) and using the estimated phase shift for the sub-carriers, all other reference symbols are phase corrected by adjusting their phase until they align with RS0 (step 207).

Mathematically, the reference symbols are phase corrected according to $$RS_i^{corr}=RS_i e^{k2\pi\Delta f_i}, i=1, 2, \ldots, N \quad (3)$$

where N represents the number of phase-corrected reference symbols.

Following phase correction, the scrambling detection procedure is then performed on the phase corrected reference symbols (step 209). This step involves, for each of N phase-corrected reference symbols, applying M different hypothetical scrambling codes ($s_i^j$, where j=1, ..., M and i=1, ..., N) to the phase-corrected reference symbols and, for each hypothetical scrambling code, computing the energy of the descrambled signal:

$$Q_j = \left| \sum_{i=1}^{N} (s_i^j) * RS_i^{corr} \right|^2 \quad (4)$$

The cell ID is indicated by that one of the hypothetical scrambling codes that resulted in the largest descrambled signal energy; that is:

$$\text{cell } ID = \max_j Q_j \quad (5)$$

It will be understood that in embodiments in which the actual form of the cell ID is not actually expressed as a number in the range 1, ..., M, the result of equation (5) is nonetheless an indicator of the actual cell ID by virtue of its indicating which of the M hypothetical scrambling codes is associated with the transmitting cell.

The description has so far focused on embodiments utilizing a model of the phase shift between sub-carriers. However, use of such a model is not essential to the invention. Alternative embodiments can advantageously utilize more complete information about the actual channel, when such information is available. For instance, consider FIG. 3a, which is an example of a channel power delay profile 300 of a two-tap channel and illustrates the effects of FFT window placement. A signal 301 is transmitted at time $t_0$. As is known in OFDM technology, a preliminary part of the signal 301 comprises a cyclic prefix (CP) that is a replication of the information carried by a tale-end of the signal 301.

Because of multi-path propagation, a first path between transmitter antenna and receiver antenna results in a first ray 303 being received at time $t_1$, and a second (longer) path results in a second ray 305 being received at time $t_2$. In order to demodulate the signal the receiver will apply an FFF. Placement of the FFT window will yield different effects. A first possible window position 307 begins at a midpoint between those moments at which the two received signals (e.g., first and second rays 303, 305) would result in zero phase shift if considered in isolation from one another. Placement in the middle causes the phase shifts from the individual received signals to be of the same size but of opposite sign. Specifically, the point (herein denoted "$t_{min\_phase}$") can be found as the midpoint between $t_1$ and $t_2$ plus the length of the cyclic prefix. However, such placement would cause the FFT to include severe intersymbol interference (ISI).

To avoid such interference, the FFT window is usually started at an earlier point in time. In order to best eliminate ISI, the FFT window should end at a time that is coincident with the end of the first ray 303. In this example, that endpoint occurs at time $t_{opt\_end}$. A second window position 309 whose endpoint coincides with time $t_{opt\_end}$ accordingly begins at time $t_{opt\_start}$.

In the more general case, a channel will have more than two paths. To illustrate this situation, FIG. 3b is an example of a complete channel power delay profile 350 and the effects of FFT window placement. A signal 351 is transmitted at time $t_0$. Because of multi-path propagation, a first path between transmitter antenna and receiver antenna results in a first ray 353 being received at time $t_{first}$, and a last (longest) path results in a final ray 355 being received at time $t_{last}$. Other rays (not illustrated) are also received by the receiver. As with the case of the two tap channel, in order to demodulate the signal the receiver will apply an FFT. As in the case described above, placement of the FFT window will yield different effects. A first possible window position 357 begins at a point between $t_{first}$ and $t_{last}$ at which the center of gravity of the impulse response occurs plus the length of the cyclic prefix. Alternatively, the point of maximum impulse response of the channel (max(h(t)) could be used. In either case, that point, which is herein denoted $t_{min\_phase}$, will result in a minimum phase rotation between sub-carriers. However, as with the two tap channel example described earlier, such placement would cause the FFF to include severe ISI.

To avoid such interference, the FFF window is usually started at an earlier point in time. In order to best eliminate ISI, the FFT window should end at a time that is coincident with the end of the first ray 353. In this example, that endpoint occurs at time $t_{opt\_end}$. A second window position 359 whose endpoint coincides with time $t_{opt\_end}$ accordingly begins at time $t_{opt\_start}$.

Figure 3A:
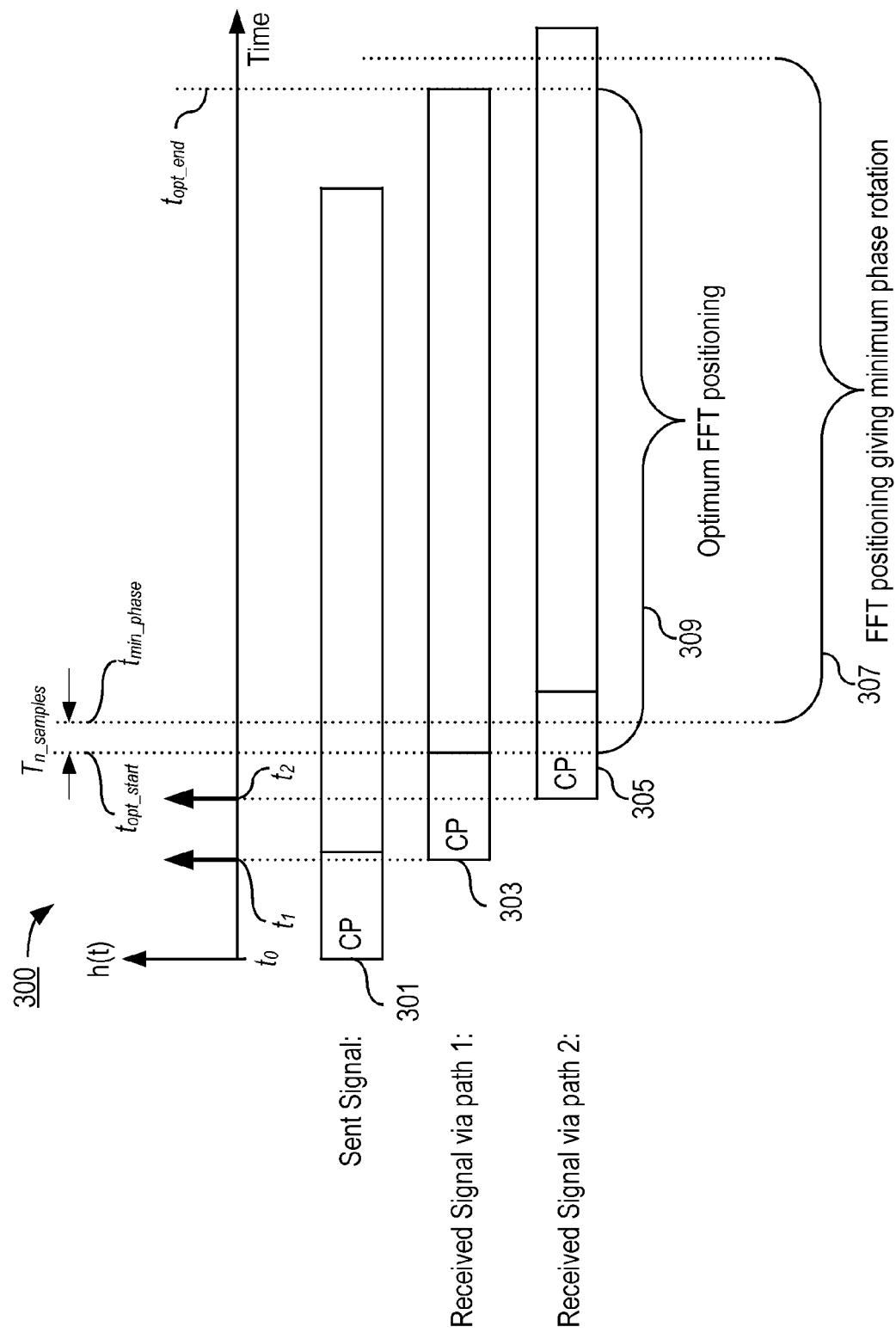
FIG. 3a is an example of a channel power delay profile of a two-tap channel and the effects of FFT window placement.
Figure 3B:
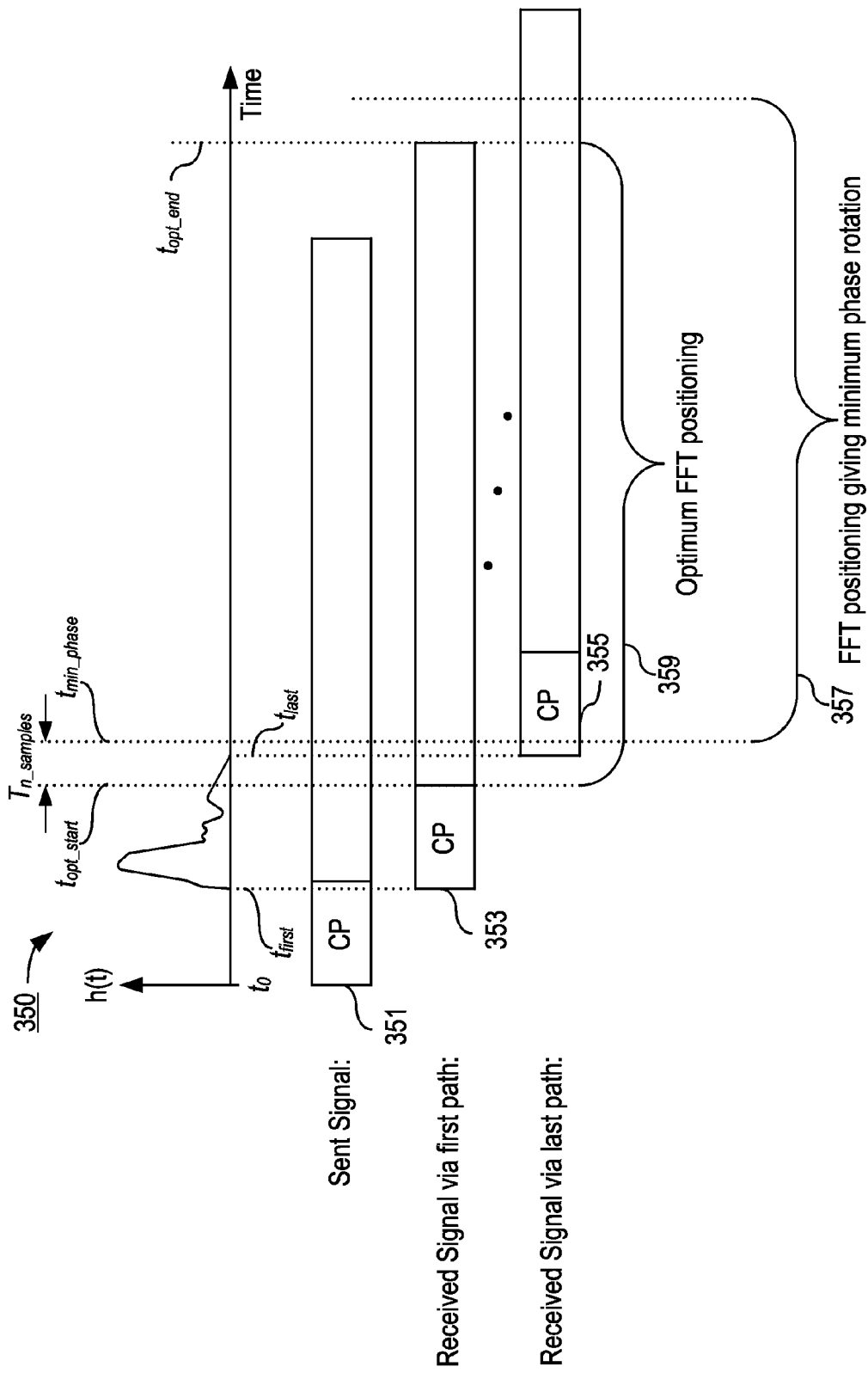
FIG. 3b is an example of a complete channel power delay profile and the effects of FFT window placement.

Regardless of whether one considers the specific two tap channel illustrated in FIG. 3a or the more general case illustrated in FIG. 3b, it can be seen that there is a distance between the point at which the FFT window should be placed to minimize phase rotation (i.e., $t_{min\_phase}$) and the point at which the FFT window is actually placed (i.e., $t_{opt\_start}$) to best avoid ISI. Let this distance be n samples, corresponding to an amount of time herein denoted $T_{n\_samples}$. This placement of the FFF window gives rise to an FFT-introduced rotation between sub-carriers k and 1 of $e^{-j2\pi(k-1)n/N_{FFT}}$, wherein $N_{FFT}$ is the size of the FFT. This expression for phase rotation can therefore be used as a basis for determining the amount of phase compensation (step 203) to be applied to the reference symbols, $RS_i$ on each sub-carrier after they have been obtained from the received signal (step 205). With this phase compensation having been performed, the remaining steps 207 and 209 are performed as described earlier.

In other alternative embodiments, still other techniques can be used to derive a phase shift function that can be utilized to determine the amount of phase compensation required for each sub-carrier when performing step 203. For example, one could convert the power delay profile (PDP) 300, 350 into the frequency domain to derive the channel estimate. The channel estimate will include phase information for each sub-carrier, and these can be used in the compensating step 203. Alternatively, one could utilize the signal, $s_i$, from the Secondary-Synchronization Channel (S-SCH) which, by the time cell ID is to be determined, is known from earlier processing. An FFT is applied to the OFDM symbol of the S-SCH to obtain a signal, $y_i$. The signal $y_i$ is known to be $$y_i = H_i s_i, \quad (1)$$

where $s_i$ is the original S-SCH symbol, and $H_i$ is the filtering applied to $s_i$ by the channel. One can therefore obtain an estimate of the channel, $\hat{H}_i$, by dividing $y_i$ by the signal $s_i$ to thereby obtain:

$$\hat{H} = y_i/s_i \quad (2)$$

The estimate of the channel model can then be used as a basis for determining the amount of phase compensation (step 203) to be applied to the reference symbols, $RS_i$ on each sub-carrier after they have been obtained from the received signal (step 205). With this phase compensation having been performed, the remaining steps 207 and 209 are performed as described earlier.

All of the embodiments discussed up to this point use a model of the phase of each sub-carrier to determine how to correct the various reference symbols. The discussion will now focus on methods and apparatuses that do not use this technique.

Figure 4:
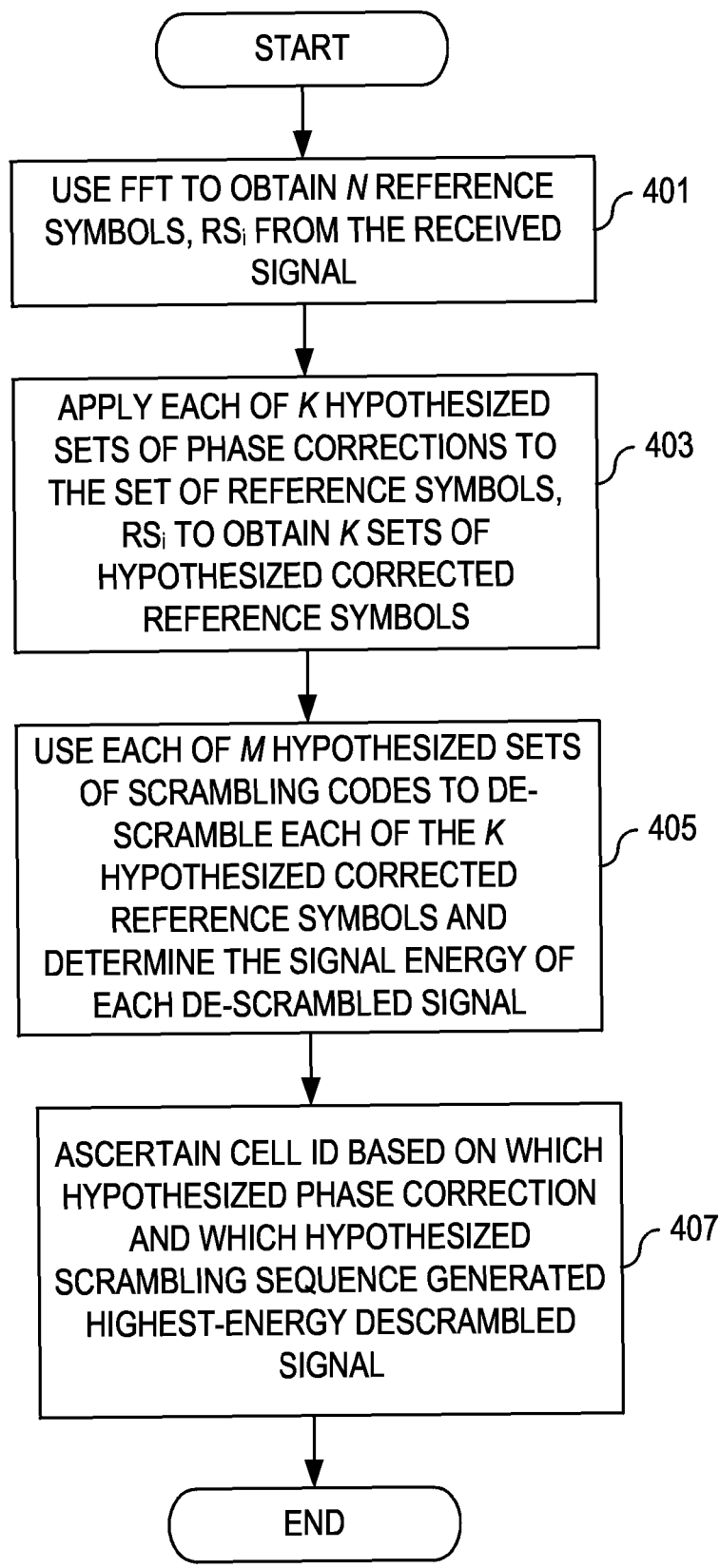
FIG. 4 is a flowchart depicting steps/processes performed in cellular communication equipment consistent with alternative embodiments of the invention that do not rely on a model of the phase of each sub-carrier.

FIG. 4 is a flowchart depicting steps/processes performed by suitable logic (e.g., hardware or software in conjunction with hardware) operating in cellular communication equipment consistent with alternative embodiments of the invention that do not rely on an estimate of the phase of each sub-carrier. The received signal is processed by an FFF (step 401). The resultant symbols will include some number, N, of reference symbols, $RS_i$ (i=1, 2, . . . , N) that will be used for cell ID detection.

Then each of a number, K, of hypothesized phase shift sequences $$P_k = [e^{j\Theta_1^k}, e^{j\Theta_2^k}, \ldots, e^{j\Theta_N^k}]^T, k=1, \ldots, K \quad (8)$$

is applied as a phase correction to the set of reference symbols (step 403) to produce K sets of hypothetical phase-corrected reference symbols, $RS_{k,j}^{corr}$, according to $$RS_{i,k}^{corr} = RS_i e^{j\Theta_i^k}, i=1, \ldots, N \text{ and } k=1, \ldots, K \quad (9)$$

where N is the number of reference symbols obtained from the FFT and K is the number of hypothesized sets of phase corrections (each set of phase corrections itself having N elements). The K hypothesized phase shift sequences are advantageously stored in a lookup table, and can be obtained from earlier-performed laboratory experiments. Different hypothesized phase shift sequences can be designed for different delay spreads and PDPs, so that at least one of them will correspond to actual conditions experienced by the communication equipment.

Then, each of M hypothesized sets of scrambling codes (each hypothesized set of scrambling codes itself comprising N elements) is applied to each of the K hypothesized sets of phase-corrected reference symbols (step 405) to compute K×M signal energy values according to:

$$Q_{k,j} = \left| \sum_{i=1}^{N} (s_i^j) * RS_{i,k}^{corr} \right|^2, k=1, \ldots, K \text{ and } j=1, \ldots, M \quad (10)$$

Now that the K×M signal energy values have been generated, the cell ID is ascertained (STEP 407) according to $$\text{cell } ID = \max_j \{ \max_k Q_{k,j} \} \quad (11)$$

In some embodiments, techniques can be applied to adapt the hypothesized sets of phase corrections, and thereby reduce the testing to a smaller number of hypotheses. For example, knowledge of the delay spread and/or PDP can be used to determine which hypothesized sets of phase corrections are more likely to represent the true setoff phase corrections. To illustrate this, suppose M pilot symbols are equidistantly spaced in frequency at a distance of Δf. The phase shift sequence will then be of the form:

$$P_k = [1, e^{j\theta_k}, e^{j2\theta_2}, \ldots, e^{j(M-1)\theta_k}]^T. \quad (12)$$

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of ascertaining which one of a number of cells of a cellular communication system transmitted an Orthogonal Frequency Division Multiplexing (OFDM) signal, the method comprising:

cellular communication equipment performing the following:

obtaining a plurality of reference symbols from the OFDM signal;

estimating one or more compensating phase shift values for aligning the plurality of reference symbols with respect to phase without utilizing a reference phase obtained by channel estimation;

generating a plurality of phase corrected reference symbols by using the one or more compensating phase shift values to align the plurality of reference symbols with respect to phase;

applying at least two scrambling code sequences to the phase corrected reference symbols to obtain at least two de-scrambled phase corrected reference symbol sequences, wherein each of the scrambling codes is associated with a respectively different one of the cells of the cellular communication system, and wherein each of the scrambling code sequences comprises at least one of a pseudorandom noise sequence and an orthogonal code;

ascertaining a power value of each of the de-scrambled phase corrected reference symbol sequences; and ascertaining which one of the scrambling codes is associated with a highest one of the power values, thereby ascertaining which one of the number of cells of the cellular communication system transmitted the OFDM signal.

2. The method of claim 1, wherein obtaining the plurality of reference symbols from the OFDM signal comprises:

obtaining one or more of the reference symbols from one or more of a number of sub-carriers of the OFDM signal; and obtaining one or more of the reference symbols from one or more other ones of the sub-carriers of the OFDM signal.

3. The method of claim 2, wherein:

obtaining the plurality of reference symbols from the OFDM signal comprises applying a Fast Fourier Transform (FFT) to a plurality of samples of the OFDM signal; and estimating the one or more compensating phase shift values for aligning the plurality of reference symbols with respect to phase comprises:

ascertaining which of the plurality of samples of the OFDM signal would be a starting point of the FFT causing a smallest rotation across sub-carriers; and estimating the one or more compensating phase shift values as a function of a relative distance between an actual starting point of the FFT and the starting point of the FFT causing the smallest rotation across sub-carriers.

4. The method of claim 3, wherein the starting point of the FFT causing a smallest rotation across sub-carriers corresponds to a maximum peak of a power delay profile of a channel through which the OFDM signal was transmitted.

5. The method of claim 3, wherein the starting point of the FFT causing a smallest rotation across sub-carriers corresponds to a center of gravity of a power delay profile of a channel through which the OFDM signal was transmitted.

6. The method of claim 2, wherein estimating the one or more compensating phase shift values for aligning the plurality of reference symbols with respect to phase comprises:

ascertaining a power delay profile of a channel through which the OFDM signal was transmitted;

applying a Fast Fourier Transform (FFT) to the power delay profile to obtain an estimate of the channel through which the OFDM signal was transmitted; and using the estimate of the channel to obtain the one or more compensating phase shift values as a function of a delay spread value.

7. The method of claim 6, wherein the power delay profile is obtained by correlating differently delayed expected versions of a known signal with an actually-received known OFDM signal to find peaks of correlation results.

8. The method of claim 7, wherein the known signal is obtained from a Primary-Synchronization Channel in the cellular communication system.

9. The method of claim 2, wherein estimating the one or more compensating phase shift values for aligning the plurality of reference symbols with respect to phase comprises:

obtaining a frequency-domain representation of a received known OFDM symbol;

dividing the frequency-domain representation of the received known OFDM symbol by a frequency-domain representation of an expected known OFDM symbol to obtain an estimate of the channel through which the OFDM signal was transmitted; and using the estimate of the channel to obtain the one or more compensating phase shift values as a function of a delay spread value.

10. The method of claim 9, wherein the received known OFDM symbol is obtained from a Secondary-Synchronization Channel in the cellular communication system.

11. The method of claim 1, wherein:

estimating the one or more compensating phase shift values for aligning the plurality of reference symbols with respect to phase comprises:

applying each of a plurality, K, of hypothesized sets of phase corrections to the plurality reference symbols to obtain K sets of hypothesized phase corrected reference symbols; and applying at least two scrambling code sequences to the phase corrected reference symbols to obtain at least two de-scrambled phase corrected reference symbol sequences comprises:

applying at least two scrambling code sequences to each of the K sets of hypothesized phase corrected reference symbols to obtain at least 2K de-scrambled phase corrected reference symbol sequences.

12. The method of claim 11, comprising:

using information about a delay spread of a channel through which the OFDM signal was transmitted to initially obtain the K hypothesized sets of phase corrections.

13. The method of claim 11, comprising:
using information about a power delay profile of a channel through which the OFDM signal was transmitted to initially obtain the K hypothesized sets of phase corrections.

14. The method of claim 11, wherein each of the hypothesized sets of phase corrections comprises phase correction values that are linear across sub-carriers.

15. The method of claim 1, wherein estimating the one or more compensating phase shift values for aligning the plurality of reference symbols with respect to phase comprises:
ascertaining a delay spread value of a channel through which the OFDM signal was transmitted; and
estimating the one or more compensating phase shift values as a function of the delay spread value.

16. The method of claim 15, wherein estimating the one or more compensating phase shift values as a function of the delay spread value comprises computing a phase shift between a first sub-carrier at frequency $f_i$ and a second sub-carrier at frequency $f_k$ in accordance with:

$$\text{compensating phase shift} = e^{j2\pi(f_i - f_k)\Delta t},$$

wherein $\Delta t$ is the delay spread value.

17. The method of claim 1, wherein each of the scrambling code sequences comprises both a pseudorandom noise sequence and an orthogonal code.

18. A machine-readable non-transitory storage medium having stored therein program instructions which when executed by one or more processors cause the one or more processes to perform a method for ascertaining which one of a number of cells of a cellular communication system transmitted an Orthogonal Frequency Division Multiplexing (OFDM) signal, the method comprising:
obtaining a plurality of reference symbols from the OFDM signal;
estimating one or more compensating phase shift values for aligning the plurality of reference symbols with respect to phase without utilizing a reference phase obtained by channel estimation;
generating a plurality of phase corrected reference symbols by using the one or more compensating phase shift values to align the plurality of reference symbols with respect to phase;
applying at least two scrambling code sequences to the phase corrected reference symbols to obtain at least two de-scrambled phase corrected reference symbol sequences, wherein each of the scrambling codes is associated with a respectively different one of the cells of the cellular communication system, and wherein each of the scrambling code sequences comprises at least one of a pseudorandom noise sequence and an orthogonal code;
ascertaining a power value of each of the de-scrambled phase corrected reference symbol sequences; and
ascertaining which one of the scrambling codes is associated with a highest one of the power values, thereby ascertaining which one of the number of cells of the cellular communication system transmitted the OFDM signal.

19. The machine-readable non-transitory storage medium of claim 18, wherein obtaining the plurality of reference symbols from the OFDM signal comprises:
obtaining one or more of the reference symbols from one or more of a number of sub-carriers of the OFDM signal; and
obtaining one or more of the reference symbols from one or more other ones of the sub-carriers of the OFDM signal.

20. The machine-readable non-transitory storage medium of claim 19, wherein:
obtaining the plurality of reference symbols from the OFDM signal comprises applying a Fast Fourier Transform (FFT) to a plurality of samples of the OFDM signal; and
estimating the one or more compensating phase shift values for aligning the plurality of reference symbols with respect to phase comprises:
ascertaining which of the plurality of samples of the OFDM signal would be a starting point of the FFT causing a smallest rotation across sub-carriers; and
estimating the one or more compensating phase shift values as a function of a relative distance between an actual starting point of the FFT and the starting point of the FFT causing the smallest rotation across sub-carriers.

21. The machine-readable non-transitory storage medium of claim 20, wherein the starting point of the FFT causing the smallest rotation across sub-carriers corresponds to a maximum peak of a power delay profile of a channel through which the OFDM signal was transmitted.

22. The machine-readable non-transitory storage medium of claim 20, wherein the starting point of the FFT causing the smallest rotation across sub-carriers corresponds to a center of gravity of a power delay profile of a channel through which the OFDM signal was transmitted.

23. The machine-readable non-transitory storage medium of claim 19, wherein estimating the one or more compensating phase shift values for aligning the plurality of reference symbols with respect to phase comprises:
ascertaining a power delay profile of a channel through which the OFDM signal was transmitted;
applying a Fast Fourier Transform (FFT) to the power delay profile to obtain an estimate of the channel through which the OFDM signal was transmitted; and
using the estimate of the channel to obtain the one or more compensating phase shift values as a function of a delay spread value.

24. The machine-readable non-transitory storage medium of claim 23, wherein the method comprises:
obtaining the power delay profile by correlating differently delayed expected versions of a known signal with an actually-received known OFDM signal to find peaks of correlation results.

25. The machine-readable non-transitory storage medium of claim 24, wherein the method comprises:
obtaining the known signal from a Primary-Synchronization Channel in the cellular communication system.

26. The machine-readable non-transitory storage medium of claim 19, wherein estimating the one or more compensating phase shift values for aligning the plurality of reference symbols with respect to phase comprises:
obtaining a frequency-domain representation of a received known OFDM symbol;
dividing the frequency-domain representation of the received known OFDM symbol by a frequency-domain representation of an expected known OFDM symbol to obtain an estimate of the channel through which the OFDM signal was transmitted; and
using the estimate of the channel to obtain the one or more compensating phase shift values as a function of a delay spread value.

27. The machine-readable non-transitory storage medium of claim 26, wherein the method comprises:
obtaining the received known OFDM symbol from a Secondary-Synchronization Channel in the cellular communication system.

28. The machine-readable non-transitory storage medium of claim 18, wherein:
estimating the one or more compensating phase shift values for aligning the plurality of reference symbols with respect to phase comprises:
applying each of a plurality, K, of hypothesized sets of phase corrections to the plurality reference symbols to obtain K sets of hypothesized phase corrected reference symbols; and
applying at least two scrambling code sequences to the phase corrected reference symbols to obtain at least two de-scrambled phase corrected reference symbol sequences comprises:
applying at least two scrambling code sequences to each of the K sets of hypothesized phase corrected reference symbols to obtain at least 2K de-scrambled phase corrected reference symbol sequences.

29. The machine-readable non-transitory storage medium of claim 28, wherein the method comprises:
using information about a delay spread of a channel through which the OFDM signal was transmitted to initially obtain the K hypothesized sets of phase corrections.

30. The machine-readable non-transitory storage medium of claim 28, wherein the method comprises:
using information about a power delay profile of a channel through which the OFDM signal was transmitted to initially obtain the K hypothesized sets of phase corrections.

31. The machine-readable non-transitory storage medium of claim 28, wherein each of the hypothesized sets of phase corrections comprises phase correction values that are linear across sub-carriers.

32. The machine-readable non-transitory storage medium of claim 18, wherein estimating the one or more compensating phase shift values for aligning the plurality of reference symbols with respect to phase comprises:
ascertaining a delay spread value of a channel through which the OFDM signal was transmitted; and
estimating the one or more compensating phase shift values as a function of the delay spread value.

33. The machine-readable non-transitory storage medium of claim 32, wherein estimating the one or more compensating phase shift values as a function of the delay spread value comprises computing a phase shift between a first sub-carrier at frequency $f_j$ and a second sub-carrier at frequency $f_k$ in accordance with:

$$\text{compensating phase shift} = e^{j2\pi(f_j-f_k)\Delta t},$$

wherein $\Delta t$ is the delay spread value.

34. The machine-readable non-transitory storage medium of claim 18, wherein each of the scrambling code sequences comprises both a pseudorandom noise sequence and an orthogonal code.

* * * * *

UNITED STATES PATENT AND TRADEMARK OFFICE
CERTIFICATE OF CORRECTION

PATENT NO. : 7,929,624 B2
APPLICATION NO. : 11/762379
DATED : April 19, 2011
INVENTOR(S) : Lindoff et al.

It is certified that error appears in the above-identified patent and that said Letters Patent is hereby corrected as shown below:

In Column 5, Line 67, in Equation (3), delete "$RS_i^{corr}=RS_i e^{k2\pi\Delta t fi}$," and insert -- $RS_i^{corr}=RS_i e^{j2\pi\Delta t fi}$ --, therefor.

In Column 6, Line 49, delete "FFF." and insert -- FFT. --, therefor.

In Column 7, Line 22, delete "FFF" and insert -- FFT --, therefor.

In Column 7, Line 23, delete "FFF" and insert -- FFT --, therefor.

In Column 7, Line 38, delete "FFF" and insert -- FFT --, therefor.

In Column 8, Line 19, delete "FFF" and insert -- FFT --, therefor.

In Column 9, Line 4, in Equation (12), delete "$P_k=[1, e^{j\theta_k}, e^{j2\theta_2}, \ldots, e^{j(M-1)\theta_k}]^T$." and insert -- $P_k = \left[1, e^{j\theta_k}, e^{j2\theta_k}, \ldots, e^{j(M-1)\theta_k},\right]^T$ . --, therefor.

Signed and Sealed this
Sixth Day of March, 2012

David J. Kappos
*Director of the United States Patent and Trademark Office*